Oct. 12, 1965
L. M. HARVEY
3,211,936
ACYCLIC GENERATOR

Filed March 16, 1960
7 Sheets-Sheet 1

Fig. 1.

Inventor
Luke M. Harvey
by James R Campbell
His Attorney

Oct. 12, 1965     L. M. HARVEY     3,211,936
ACYCLIC GENERATOR Filed March 16, 1960     7 Sheets-Sheet 2

Fig. 2.

Inventor
Luke M. Harvey
by James R. Campbell
His Attorney

Fig. 3.

Inventor
Luke M. Harvey
by James R Campbell
His Attorney

Oct. 12, 1965  L. M. HARVEY  3,211,936
ACYCLIC GENERATOR

Filed March 16, 1960

Inventor
Luke M. Harvey
by James R Campbell
His Attorney

Oct. 12, 1965　　　　L. M. HARVEY　　　　3,211,936
ACYCLIC GENERATOR

Filed March 16, 1960　　　　　　　　　　　　7 Sheets-Sheet 5

Inventor
Luke M. Harvey
by James R. Campbell
His Attorney

Fig. 10.

Inventor
Luke M. Harvey
by James R Campbell
His Attorney

Oct. 12, 1965

L. M. HARVEY 3,211,936

ACYCLIC GENERATOR

Filed March 16, 1960

INVENTOR.
LUKE M. HARVEY

BY *James R. Campbell*

ATTORNEY

3,211,936
ACYCLIC GENERATOR
Luke M. Harvey, Schenectady, N.Y., assignor to General Electric Company, a corporation of New York
Filed Mar. 16, 1960, Ser. No. 17,447
21 Claims. (Cl. 310—178)

This application is a continuation-in-part of applicant's prior application Serial No. 784,691, filed January 2, 1959, now abandoned, entitled Homopolar Generator, and assigned to the same assignee as the present invention.

The invention described herein relates to dynamoelectric machines and more particularly to an acylic generator designed for generating currents of large magnitude at relatively low voltages.

The demands for conventional generating equipment has limited the opportunity for design and development of homopolar or acyclic generators and the art accordingly has not developed to the advanced state of other rotating machinery. Known successful acyclic generators utilize metal-graphitic brushes for transferring current from the rotating armature to the machine terminals, but this means for transferring current has several important drawbacks. Basically, unusually large current collector surfaces must be employed to handle the generated currents, thus requiring a large number of brushes of large size to be used with the machine. The armature speed or rubbing velocity must accordingly be maintained at low values but the brush and electrical losses nevertheless are extremely high as compared to the generated voltage. The use of brushes requires low armature peripheral speeds to avoid accelerated brush wear and because of the large voltage drop at the brush, low efficiency results.

The use of mercury and sodium-potassium liquid metals have been suggested as the agent for transferring current from the armature across the air gap to the stator prior to delivery to the machine terminals and this means appears more promising than the brush arrangement for collecting current.

The disadvantages of such a system however, reside in the fact that surface contact cannot be maintained effectively between the metallic liquid and the surfaces of the armature and stator because the liquid metal cannot be pressurized by prior art designs to any substantial extent in the current transfer area or air gap. Attempt has been made to produce a pressure head in this region by providing structures designed to confine the liquid to the current transfer area but other factors affect any desirable benefits obtained by the pressure producing parts. For example, magnetic forces acting on the liquid metal in the air gap tend to push it toward the ends of the machine and out of the gap and since impediments are not placed in its path, reduction of pressure and arcing consequently results. Another contributing factor lies in the requirement for circulating large quantities of the metal through the air gap for removing heat developed by friction. In order to facilitate the pumping action, liquid metal discharge openings are also located in the air gap which serves to bleed off any pressure established. Moreover, it is difficult to seal the liquid in the current collecting area and only a smaller amount of material is available for transferring even smaller amounts of current across the air gap.

Further, prior acyclic generators employ massive copper bars for transferring current from the machine to terminals connected with a network of bus bars. Current from the machine is fed into one side only of the copper bars and the side nearest the terminal tends to receive more current than the other, thus creating unbalanced current flow. The iron of the stator is used for carrying current but the resistance of the iron is so much greater than the copper in the heavy terminals that the effect of the unbalance of current is reduced to a substantial extent. In other machines of this type where carbon brushes are used for collecting current, the problem of unbalanced current flow is minimized because the potential drop in the brushes is so high as compared with that in the bus work structure, that the bus resistance becomes insignificant. Nevertheless, a principal disadvantage of these prior constructions is that the non-uniform distribution of current is a major factor in causing excessive rotor and stator heating and poor compression and regulation.

It therefore is an object of my invention to eliminate the above disadvantages inherent in prior art acyclic generators by providing a construction capable of establishing and maintaining a positive liquid pressure in the current collector region for facilitating transfer of current across the armature air gap for delivery to the machine terminals.

Another object of my invention is to provide a design of stator and armature parts which coact during operation to automatically pressurize the liquid metal to values corresponding to useful current drawn from the machine.

Another object of my invention is to provide a construction capable of circulating large amounts of liquid metal through the current transfer chamber by using relatively few openings in the stator core.

Still another object of the invention is to provide a novel construction for transferring current from the generator to bus bars mounted externally of the machine.

In carrying out my invention, I provide a solid armature core mounted for rotation in a stator core. The armature surface is equipped with outwardly protruding flanges or collectors of square shape configuration having flat peripheral surfaces arranged to mate with corresponding channels or grooves in the stator to form a current transfer chamber. A metal liquid is supplied through inlets on opposite sides of the stator and into the chamber existing between the flat peripheral collector surface of the armature and the mating inner peripheral surface of the stator channel. Rotation of the armature imparts a velocity to the liquid and discharge from the chamber is accomplished through a plurality of spaced openings positioned in the stator side walls of the chamber. In order to establish and maintain a positive pressure head in the chamber for providing full surface contact between the liquid and the armature and stator, and thereby obtain efficient transfer of currents of large magnitude across the chamber air gap, a pumping device formed by coacting stator and armature surfaces acts to pressurize the liquid in the chamber during machine operation. Although magnetic and other forces tend to push the liquid out of the chamber, the pumping device establishes a counter force in the liquid which is effective in maintaining the desired amount of liquid in the chamber. The pressurized liquid is effective in permitting transfer of current from the armature to the stator where it flows to terminate in a direction opposite to generated current flow in the armature. Arranging the current flow paths in this manner limits the reactance in the machine and permits it to handle rapid changes in current.

The subject matter which I regard as my invention is particularly pointed out and distinctly claimed in the concluding portion of this specification. My invention, however, both as to organization and method of operation, together with further objects and advantages thereof, may best be understood by reference to the following description taken in connection with the accompanying drawing in which:

Figure 1:
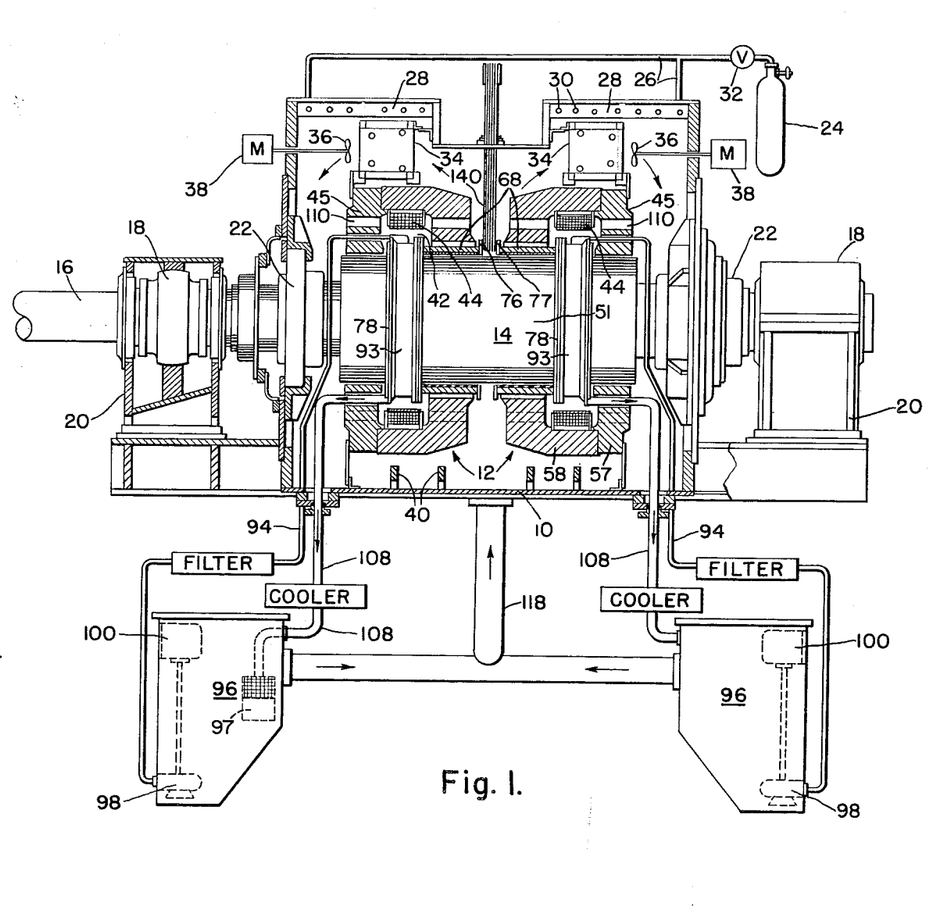
FIGURE 1 is a view in elevation, partly in section, of a generator including the liquid metal circulating system and showing the rotor and a portion of the stator in full.

Referring now to the drawings wherein like reference characters designate like or corresponding parts throughout the several views, there is shown in FIGURE 1, a housing 10 enclosing a pair of stator cores 12 and a single rotor 14 arranged for electrodynamic cooperation therewith. The particular machine chosen to illustrate the inventive concepts herein is designed to produce 550,000 amperes at 45 volts. The rotor shaft 16 is supported in bearings 18 mounted on pedestals 20 on opposite ends of the machine. To provide for optimum cooling, the housing is charged with a gas, such as nitrogen, and made airtight by oil seals 22 surrounding the shaft and at other points where the housing is pierced for accommodating gas and liquid metal supply and return pipes. Nitrogen, helium or argon gas or any other gas capable of protecting the hereinafter named liquid metal from oxidation, is admitted to the machine from a source of supply, such as a flask 24 having pipes 26 directly connected with distribution pipes 28 located in the upper portion of the machine. In order to provide for equal distribution of gas in the machine, the pipes 28 preferably are provided with apertures 30 thus eliminating concentration of gas in any particular area of the housing. A pressure of approximately 0.5 p.s.i. is maintained within the housing by a conventional pressure regulator valve 32 mounted in the gas supply system. It will be evident that other types of gases besides nitrogen may be used as well as different pressures so long as the desired cooling effect can be obtained. Dissipation of heat from the nitrogen is accomplished by heat exchangers 34, mounted in the upper portion of the casing, and having water or other heat exchange fluid supply and return pipes, not shown, for circulating liquid through the cores and obtaining cooling of the gas in a well known manner. Fans or blowers 36 driven by motors 38 positioned adjacent the cores, circulate the gas through the machine and in a manner more fully described hereinafter. Circumferential ribs 40 provide strength to the housing containing the operating parts.

Figure 2:
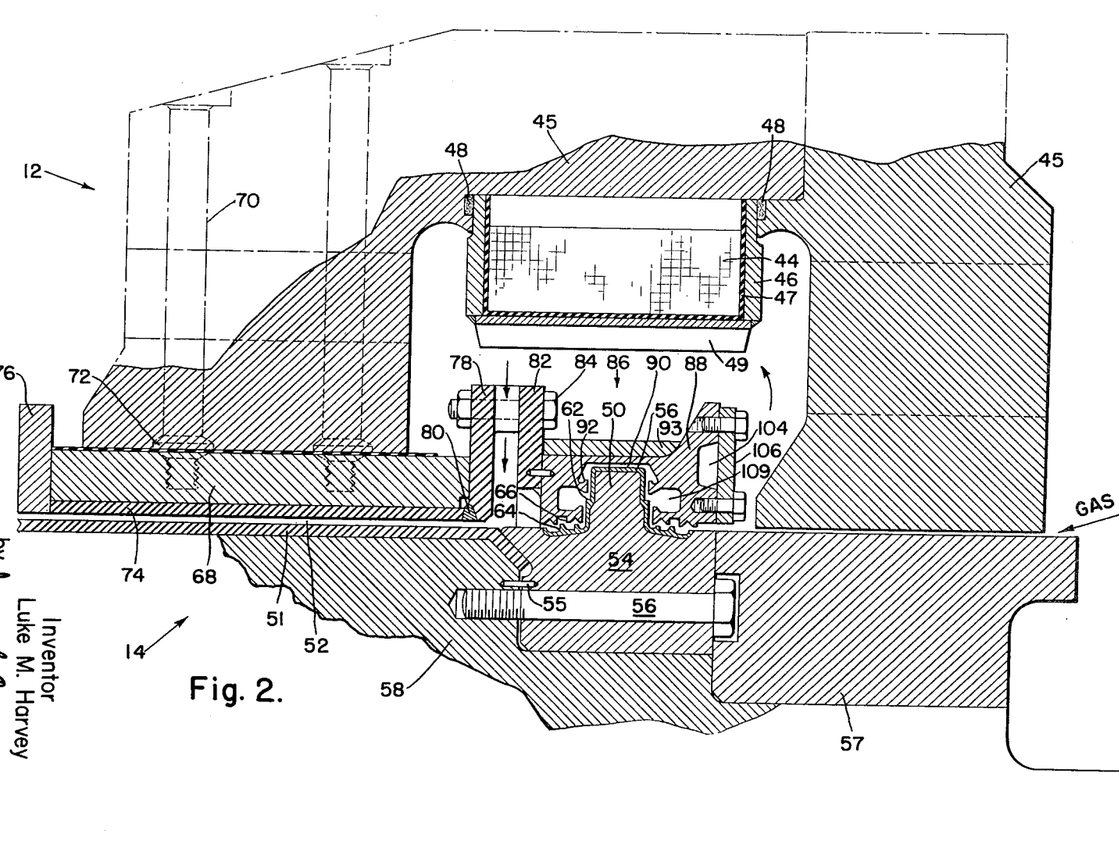
FIGURE 2 is an enlarged view of parts forming the current transfer chamber.

As illustrated in FIGURES 1 and 2, the machine comprises a pair of identical cylindrical stators 12 arranged for coaction with the single rotor core 14. Although a generator is shown, it will be evident to those skilled in the art that the inventive teachings are applicable as well to motors and other types of dynamoelectric machines. A single or plurality of stators may be used in conjunction with the motor according to the desired current output. Each stator core is supported by the housing and is laminated in a manner to provide a centrally disposed cavity 42 for receiving a toroidal-shaped coil 44 used for supplying useful flux in the machine. The coil is of conventional design and in this embodiment, is held in position by an annular-shaped member 45 comprising a portion of the stator core, and a frame 46 spaced from the coil by insulation 47. In order to prevent escape of gas from the housing, packing 48 or other sealing means is provided at the junction of the coil body and the member 45. Fins 49 assist in dissipating heat from the coil when the machine is operating.

The rotor 14 is not provided with conductors but consists of a solid magnetic steel core having that part of its surface between adjacent coils 44 covered with a pair of axially spaced copper cylindrical rings 51 which are shrunk on or otherwise affixed to the solid core body. The copper rings are of greater conductivity than the mass of the rotor and serve to conduct current to their respective current collectors 50 mounted on the rotor. During operation, flux produced by the coils 44 enters the rotor to generate a voltage which causes current flow to the individual current collectors 50 by way of the separate copper rings 51 mentioned above.

As illustrated in the enlarged view in FIGURE 2, each current collector 50 is formed on the peripheral surface of the rotor, protrudes outwardly into the air gap 52, and comprises a rotating collector ring 54 equipped with a stainless steel facing 56 extending over the peripheral and side surfaces as shown in FIGURE 2. The collector ring 54 is secured in the rotor body by dowels 55 and bolts 55' extending around the rotor periphery and the bolts serve to provide firm contact pressure between the ring 54 and the body 58 of the rotor. In a preferred embodiment, the bolts 55' are eliminated and parts 54, 57 and 58 made in one piece to permit economy in manufacture and to improve the electrical operating characteristics. These shoulders merge into ridges 64 which coact with like ridged members 66 formed on the stator for forming a labyrinth used for preventing escape of liquid from the current transfer chamber 90.

The stator is equipped with cylindrical rings 68 each having the same magnetic properties as the core and each are secured in position by a plurality of insulated bolts 70 extending radially through the core and terminating in threads in the cylindrical ring. Creepage spaces 72 are located at the joint made by the stator core and the cylindrical member. The inner peripheral surface of the stator is also covered with copper 74 or similar material of high conductivity for conveying current to the machine terminals 76. A copper cylindrical plate 78 abuts the ring 68 but is welded at 80 to an end of the copper member 74 thereby providing firm electrical contact between these parts. A similar copper plate 82 is spaced axially therefrom with connection between the two being made by bolts 84 which extend completely around the stator but have spaces therebetween for permitting flow of gas to the operating parts. The stator current collector 86 is doweled to ring 82 to assure its alignment in the machine.

The most important part of the invention and that which has made possible the transfer of current across the air gap in magnitudes not formerly believed possible, while still maintaining economical and efficient operation of the machine, resides in the principles and construction employed in the design of the stator and rotor current collectors which are used for pressurizing the liquid metal in the current through chamber 90. In known acyclic generators, the factor limiting the transfer of currents of large magnitude across the air gap is an inadequacy of structure necessary for establishing and maintaining a pressure in the liquid metal circulated in the current transfer chamber formed between the rotor and stator current collectors. The existence of little or no pressure in the current transfer chamber results in void areas not occupied by the liquid and since the current density is large, high intensity arcs are established across the chamber to the iron of the stator which in a short time makes the machine inoperative. Another major factor contributing to poor operation of prior machines, is that as the liquid is circulated in the chamber and the combined action of centrifugal and magnetic forces moves the liquid axially from the chamber, no structure or force is provided to resist such outward movement. This action contributes to a decrease in pressure and loss of liquid in the gap. The present invention eliminates the undesirable attributes of the prior art generators by providing a design for the current collectors such that coacting parts on the stator and rotor perform a pumping action for maintaining the desired quantity and pressure of liquid in the current transfer chamber, while simultaneously providing the necessary liquid metal supply and return passages to permit circulating the desired amount of metal through a cooling system for removing absorbed heat resulting from viscous and electrical losses during operation.

Referring more specifically to the stator current collector 86 shown on the right side of FIGURE 1, and in FIGURE 2, a circular ring 88 U-shaped cross-section is positioned in the stator for receiving the rotor current collector 50. As indicated in FIGURE 2, the central inner portion of the stator current collector cooperates with the peripheral surface of the rotor current collector to form the current transfer chamber 90. The current transfer chamber is the most important part of the structure. It is designed to contain the liquid metal used for transferring current from the rotor collector to the stator collector. As shown in FIGURE 2, the rotor collector is of substantially square cross-section while the stator collector is equipped with a complementary collector channel and includes sides diverging outwardly and terminating in a pair of oppositely disposed pumping rings 92. Liquid metal is introduced into the current transfer chamber 90 formed between the rotor and stator collector peripheral surfaces, by a pair of pipes 94 respectively connected at the top and bottom of ring 88 having ducts 102 in communication with the chamber, although it will be evident that a greater or less number of pipes connected at still different points may be used. With the chamber 90 filled through pipes 94 and ducts 102, resistance between the peripheral surface of the rotating collector and the liquid metal imparts centrifugal force to the liquid in addition to absorption of substantial quantities of heat resulting from friction between the parts. Magnetic forces in the machine act on the liquid metal in a direction forcing it axially out of the current transfer chamber. Where this occurs, the outwardly displaced liquid flows into contact with the circular pumping lands 92 which divert it into contact with the flat sides of the rotating rotor. The moving side surfaces of the rotor forces the liquid metal into the current transfer chamber against the action of the magnetic pumping forces thus providing a pressure in the chamber 90 such that the liquid is maintained in intimate contact with the peripheral surfaces of the rotor and stator current collectors. This permits unimpeded transfer of current across the air gap in the machine. Even though heated liquid metal is being removed continuously from the current transfer chamber, the pressure does not drop below a value where void areas would occur therein. A balance is obtained for the different rotor speeds between the liquid metal inlet pressure and the pumping pressures resulting from magnetic forces moving liquid out of the chamber and pumping forces returning it to the chamber.

Figure 3:
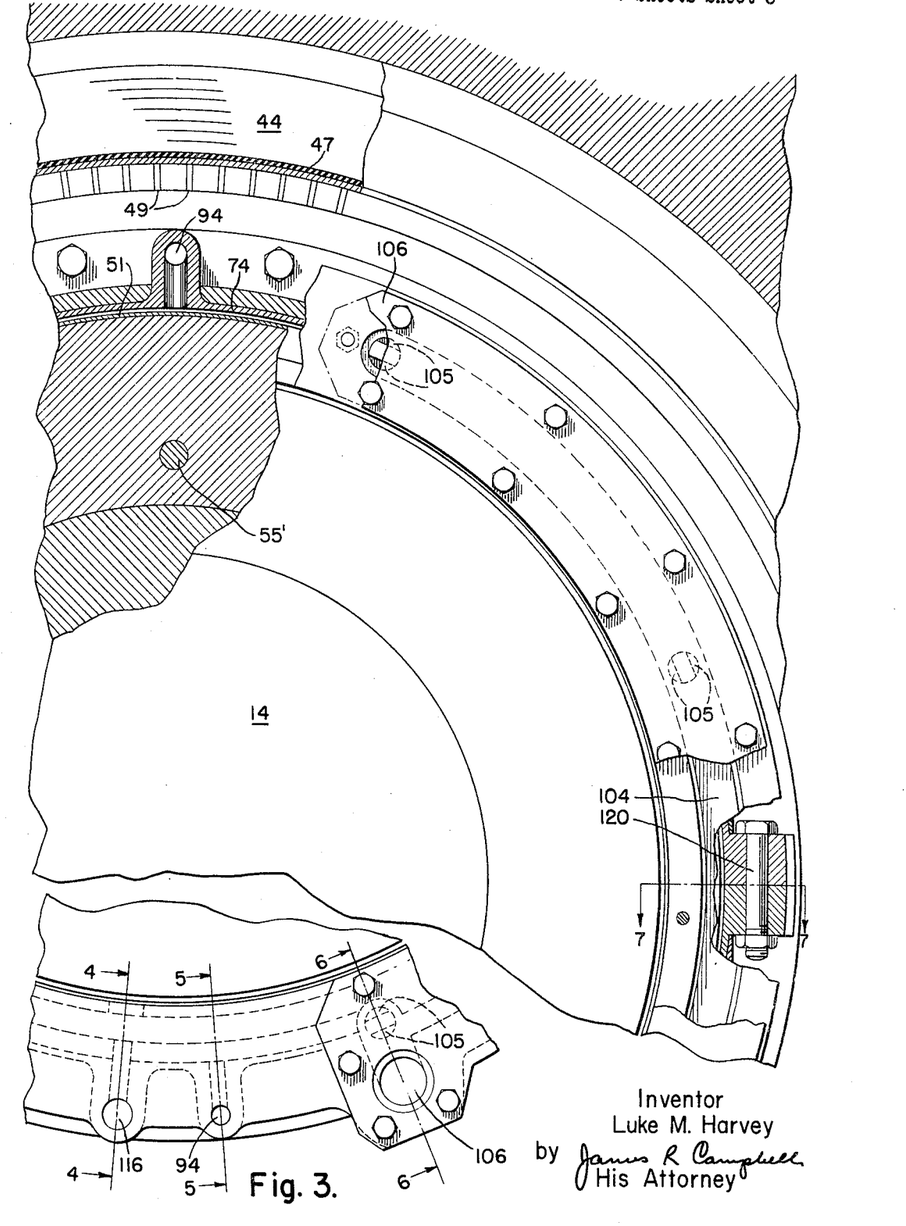
FIGURE 3 is an enlarged view illustrating liquid metal supply and return connections on the stator.
Figure 5:
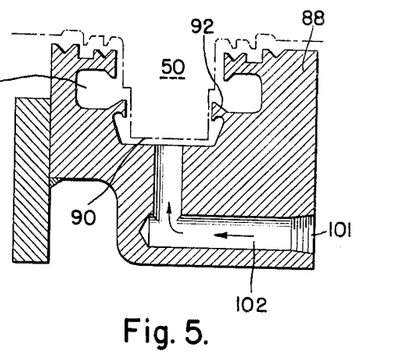
FIGURE 5 is a view taken on lines 5—5 of FIGURE 3.

The liquid metal supply pipes 94 used for delivering the metal to the current transfer chamber 90 are connected in a system including liquid metal supply tanks 96 equipped with pumps 98 driven by motors 100. The liquid metal preferably comprises a sodium potassium alloy although other liquid metals can be used. The liquid must be compatible with the metal in the machine and the tank and pipes used in circulating the liquid in the system. Such liquids may also comprise gallium, mercury, tin, lead, bismuth, or any other material having the characteristics of a good wetting agent, of high conductivity, low viscosity, relatively inert and a wide temperature range between the boiling and freezing point. The circulating system shown in FIGURE 1 illustrates only a single supply and return pipe although it is to be understood that a plurality of pipes are used for supplying and returning the liquid from the various parts within the machine housing. As shown in FIGURES 3 and 5, liquid metal is supplied from pipes 94 to inlets 101 and through bored axial passageways 102 prior to turning inwardly in a radial direction for delivery to the current transfer chamber 90. The liquid is supplied under pressure to both the top and the bottom of the machine and as the rotor turns, the adjacent surfaces of the stator and rotor drag the liquid metal circumferentially around the chamber while simultaneously building up an opposing pressure, but also, generating considerable heat.

As previously mentioned, the centrifugal and magnetic forces developed during operaiton tend to dispel or push the liquid metal axially toward the sides of the chamber 90 which normally would result in reduction in pressure and establishment of void areas in the liquid. The pressure however is maintained by the annular pumping rings 92 which collect the dispelled liquid and pump it back into contact with the sides of the rotating rotor collector, which in turn carries it back into the current transfer chamber. The liquid metal is therefore confined in this small area by the construction illustrated in the drawings. Complete surface contact betwen the stator and rotor current collector is therefore maintained, thus permitting efficient transfer of current from the rotor across the air gap to the stator prior to delivery along the copper surface 74 to the attached terminal 76.

Figure 4:
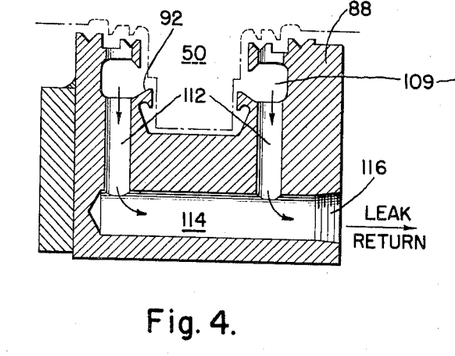
FIGURE 4 is a view taken on lines 4—4 of FIGURE 3.
Figure 6:
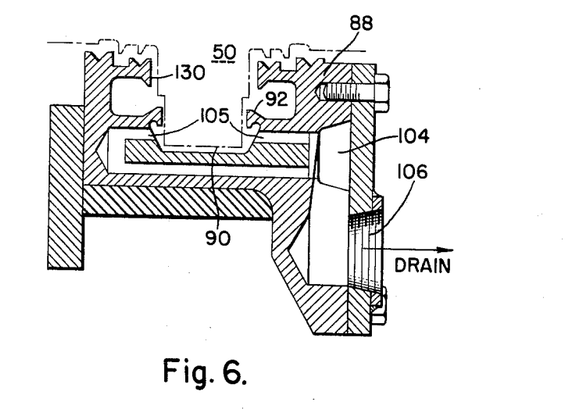
FIGURE 6 is a view taken on lines 6—6 of FIGURE 3.

The liquid must be cooled however, and in the present embodiment, eight spaced ports 105, FIGURES 3 and 6, are provided on each side of the chamber between the pumping rings 92 and the inner peripheral surface of the stator current collector. Since the current transfer chamber is under a pressure, the size and number of ports are selected to deliver a predetermined amount of liquid axially from the chamber to the manifold 104 which returns the heated liquid through drain connections 106 and return pipe 108 to the tank. The pressure of the liquid will not drop to zero because the ports 105 are of such small diameter and few in number to maintain the desired pressure. If additional pumping ability is required, the parts can be relieved on their leading edges. In practice, it is desirable to provide for positive circulation of liquid metal out of annular channels 109 which collect leakage liquid from the current transfer chamber. The channels extend the circumferential length of the stator and are equipped with a single drain opening 116 at the bottom of the stator core. As shown in FIGURE 4, access to the drain connection 116 is made by passageways 114 also located at the bottom of the stator core.

In order to provide for cooling of the machine, the collectors operate in a region of relatively high-pressure nitrogen and are vented to a relatively low pressure region through the annular channels 109, which also serve as a return for metal leaking out of the current transfer chamber. The gas is circulated through the coolers in the direction as indicated by the arrows and then flows in parallel paths axially through the air gap and through openings 110 for delivery to the cavity housing the coil 44 as shown in FIGURES 1 and 2. As viewed in FIGURE 2, as the gas flows through the air gap on the right, it divides into two paths, one leading to the labryrinths associated with the current collectors while the other leads to the cavity housing the coil. Since spacers divide plates 78 and 82, the gas is permitted to flow between the plates and into the labyrinth formed on the left side of the rotor current collector. One function served by the gas is to assist in preventing liquid metal from flowing from the current transfer chamber through the labyrinths and into the machine air gap. Any liquid particles however that leak from the chamber, are restrained from escaping into the labyrinth and the air gap by the gas flowing in the opposite direction. As indicated previously, the combined mixture of gas and liquid metal is then delivered through drain connection 116 and returned to the tank where the gas is separated and returned to the machine through pipes 118.

Since the nitrogen returning from the machine is laden with particles from the sodium-potassium solution, separation must be made before these components effectively can be re-used. As shown in FIGURE 1, the return pipes 108 carrying commingled nitrogen and liquid metal enter the tank 96 and terminate in a separator 97. The separator comprises a container having a screened bottom and top with the sides preferably made of more solid material. In order to obtain condensation of the liquid metal particles, stainless steel raschig rings are placed in the container 97. When these components flow into the container, the liquid metal condenses on the rings and drops harmlessly into tank 96. The separated gas then flows through supply lines 118 to the machine for re-use.

Figure 7:
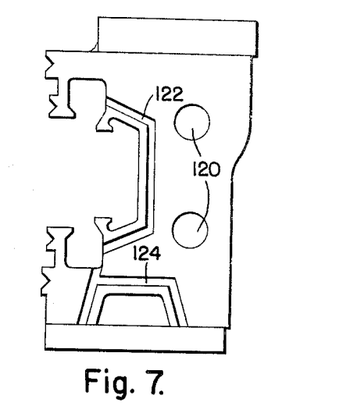
FIGURE 7 is a view taken on lines 7—7 of FIGURE 3.

FIGURE 7 illustrates a plan view of the joint used for interconnecting the separate halves of the machine. These halves are bolted together by bolts 120 and are provided with grooves 122 and 124 for receiving gaskets or other sealing means effective in preventing escape of liquid from the combined channels and chambers in the machine.

The terminal construction illustrated in FIGURES 1, 8, 9 and 10 is designed to provide balanced flow of current into or from the stator. The disposition of conductors interconnecting the stator with the terminals and the fact that the rotor resistance is so small as compared with the resistance of the bus work, makes possible the desired distribution of current in the machine.

Figure 8:
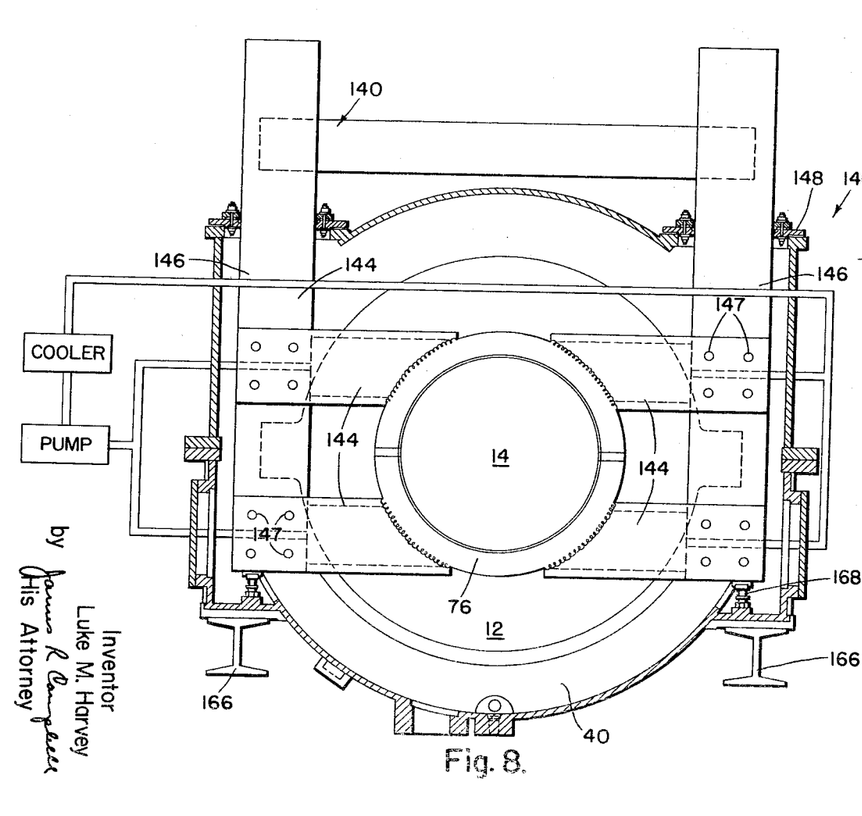
FIGURE 8 is an enlarged view of terminals used in conveying current from the generator to bus bars outside the machine.

Referring more specifically to these figures, it will be seen that the terminal construction comprises a pair of solid copper rings 76 and 77 encircling the stators and welded or otherwise secured to the cylindrical stator conductors 74 for receiving current from the stator current collector. FIGURE 1 illustrates only a general arrangement of parts but it will be seen that the ring 76 on the left side of the terminals 140 serves the left hand stator while the right ring 77 serves the stator shown on the right in this figure. In order to provide for equal distribution of current in the machine, each ring is tapped at four equidistantly spaced points by laminated copper plates 144 which extend horizontally from the ring to a point where they are interleaved with vertical risers 146 utilized in carrying the current to bus bars positioned exteriorly of the machine. The horizontally extending connectors comprise eight leaves, each of which measures approximately 1/8" x 12". As illustrated in FIGURE 8, the four copper bar connectors on each side of the machine are divided so that the upper set delivers current from the upper half of the machine while the lower set is connected to the lower half. The bar connectors preferably are welded on one side to the copper rings 76. The other ends thereof are interleaved with these vertical risers 146 which consists of eight solid copper leaves, each having 1/4" x 12" dimensions. As illustrated, the leaves of the connectors mesh with the corresponding leaves in the vertical risers, the whole unit being secured together by bolts 147. In order to conserve space and supply rigidity to the vertical risers, it is desirable to mechanically tie the positive and negative risers together with insulated bolts 150, FIGURE 10, having insulators and washers 152 on opposite sides of the riser. A heavy section of insulating material 153, such as Textolite, electrically isolates the risers from each other.

Figure 10:
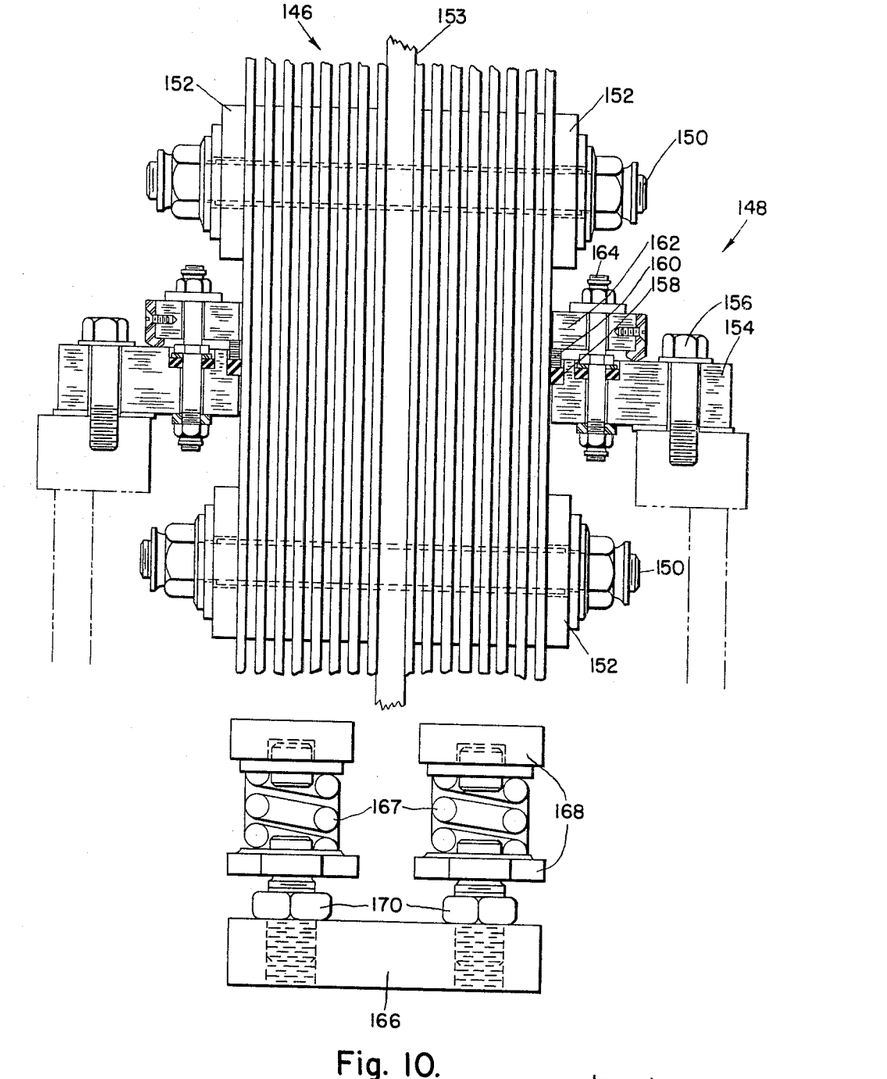
FIGURE 10 is an enlarged view of a seal used for providing a fluid tight seal for the terminals where they leave the generator.

Since the machine is filled with nitrogen and adapted to operate under pressure, a seal 148 is used for accommodating the vertical risers where they pass through the housing of the machine. The opening in the housing and the risers is of square configuration and an insulating plate 154 having a matched opening therein fits over the housing opening and around the vertical risers for centering the risers with respect to the machine. Bolts 156 secure the plate to the housing and a gasket 158 and compression ring 160 are deformed into engagement with the sides of the vertical risers by an insulator 162. Bolts 164 are used to perform this function.

Since the weight of the terminals is in the neighborhood of several thousand pounds, the forces are transmitted to the base 166 through a plurality of springs 167 held in position by insulated plates 168. Adjustable bolts 170 assure proper distribution of load from the riser to the base.

Figure 9:
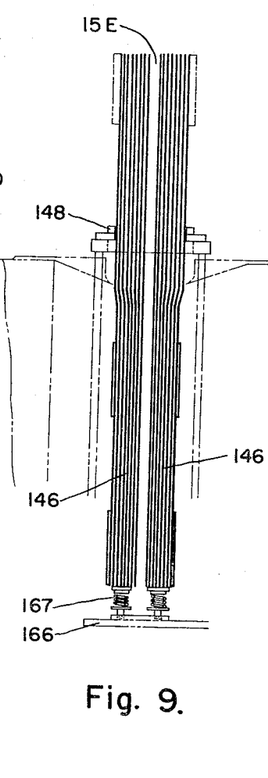
FIGURE 9 is a side view of the terminals shown in FIGURE 8.

As viewed in FIGURE 9, it will be seen that the vertical risers for the positive and negative sides of the machine are spaced a relatively short distance apart but the Textolite effectively serves as an effective insulating medium. A single tap 142 may be provided for each positive or negative terminal but since the risers extend vertically on each side of the machine it is necessary to interconnect the appropriate risers by a series of like laminated leaves 174 of a size sufficient for carrying the current. Since one of the objectives is to provide a balanced flow of current in the machine, it will be evident that other different types of electrical connections may be used.

The specific construction shown in FIGURES 8, 9 and 10 does not show in detail the specific design of the conductive plates 144 and rings 76 and 77 because of their conventional construction, but it will be understood that these current carrying parts are cooled with oil adapted for circulation therein. Both the plate conductors and rings are hollow so that oil may be circulated therethrough in its passage from one side of the machine to the other. Obviously, insulators, a source of oil supply and the necessary piping and cooling means for completing the cooling system, including the parts to be cooled, are connected in circuit in a manner well known in the art.

Athough a specific construction for the stator current collector 86 has been shown, it will be evident that other configurations and materials may be used. For example, instead of providing the cladded copper surface 93, the collector may be made of copper-aluminum alloy, stainless steel or any other material providing properties of strength, conductivity and being non-magnetic. In such an alternative construction, the thickness of the wall opposite the rotor current collector would be increased to provide the desired degree of conductivity.

Also, the rotor and stator current collectors need not have straight or uninterrupted adjacent surfaces. Circumferential grooves may be formed in the central portions of the collectors. This construction will provide for even more uniform distribution of liquid in the transfer chamber while also helping to reduce any leakage from this area. Obviously, other configurations that will perform the functions of pressurizing the liquid, while maintaining full contact between the surfaces, may be resorted to. Such a configuration, for example, appears in FIGURE 11. In this construction, the only important difference over the acyclic generator previously described is the design of rotor and stator current collectors. Considering the rotor first, it will be seen that the collector 50 coacts with a peripheral surface portion 88 in the stator to form the current transfer chamber 90. The right side of the rotor collector as viewed in FIGURE 11 consists of a flat vertical surface 180 uninterrrupted throughout its length. The collector merges into a labyrinth comprising cylindrical surfaces 182 and 184 having flanges 196 projecting outwardly therefrom. The flanges coact with liquid metal leakage recesses 188 formed in the stator, and it will be evident that any particles of liquid metal escaping inwardly from chamber 90 will be thrown into the recesses 188 for delivery to the machine drains.

Figure 11:
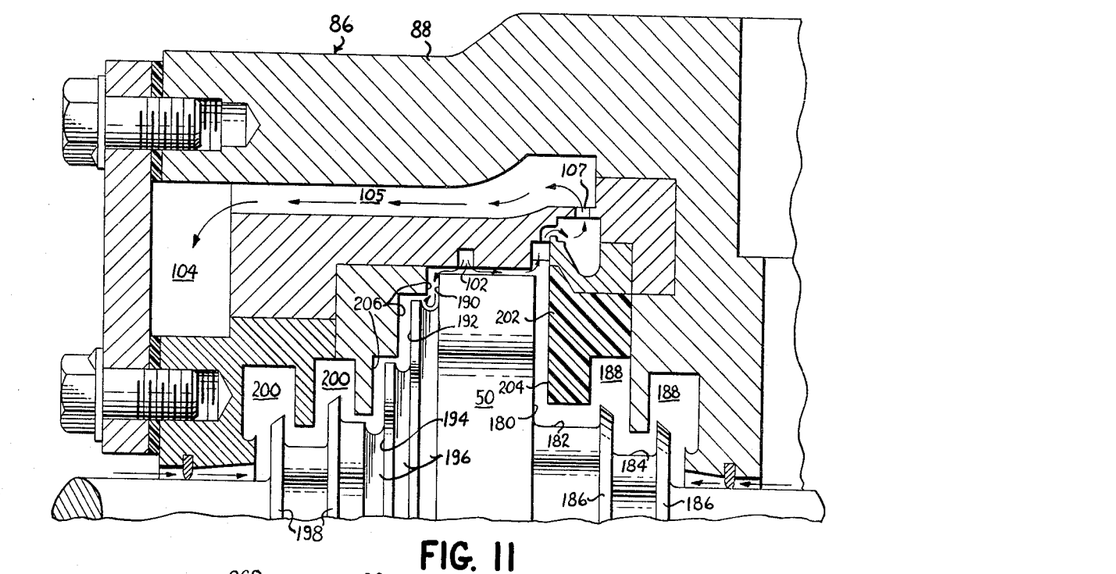
FIGURE 11 is a sectional view in elevation of a modified form of rotor and stator current collectors.

The left side of the rotor collector is equipped with a number of flat surfaces 190, 192 and 194 spaced radially and axially from each other by curved lands 196. A labyrinth consisting of shaft mounted flanges 198 and leakage recesses 200 also is provided on the left side of the collector.

Referring to the stator, the right side as viewed in FIGURE 11, includes an insulating ring 202 having a surface 204 mating with the flat side 180 of the rotor collector.

This insulator serves to minimize establishment of circulating currents in the chamber 90 when the machine is in operation. The left side of the stator collector is equipped with wall surfaces 206 generally complementary to the sides 190, 192 and 194 of the rotor. These complementary surfaces perform the function of a pump as more fully explained hereinafter. Liquid metal is introduced into the chamber through six spaced inlets 102, with discharge to the drain 106 occurring on the right side of the chamber only. When the rotating liquid metal leaves the chamber, its high centrifugal force causes it to flow directly to channel 104 for delivery to drain 106, as shown in FIGURE 3. Access to the channel 104 and drain 106 is made by twelve axial ducts 105. Each duct is equipped with a scoop 107 at its entrance which diverts the liquid into the axial ducts 105, thus providing a simple but effective means for moving liquid metal through the chamber 90.

When the machine is in operation, that is, with the rotor turning, coils 4 energized and liquid metal present in the transfer chamber 90, leakage flux from the coil 44 associated with each collector, establishes circulating currents in the liquid metal in the chamber 90. These currents plus the useful current being generated by the machine exert magnetic forces on the liquid to expel or pump it to the left and out of the chamber, as viewed in FIGURE 11. When this occurs, the liquid particles engage the outermost side wall surfaces 206 only and are immediately diverted against the surfaces 190 of the collector which moves them outwardly toward the chamber again. This repeated action is of a pumping nature and effectively resists the magnetic pumping action tending to displace the liquid out of the chamber. It establishes a pressure in the liquid metal. However, since liquid metal simultaneously is being pumped into chamber 90 from a remote source, and a certain amount is being discharged to the drain, a balance between the various forces acting on the liquid metal in the chamber is reached very quickly. For normal operation, it is believed that the liquid is displaced inwardly about one-half the radial length of wall 190.

It is evident that the centrifugal force of the rotating liquid metal is very high, and since the pumping lands are effective in moving the metal to the right for discharge into the drain, while keeping the chamber at constant pressure, the liquid is accelerated rapidly outwardly toward the drain when it leaves the chamber. Because this is an automatic action, it is not necessary to provide any special devices between the chamber 90 and surface 182 on the collector. Any particles falling in this area engage the walls of rotor and are returned to the drain or are thrown outwardly toward the drain when contacted by surface 182. If this not effective, such particles are delivered to the drain by the leakage recesses provided in the labyrinth seal. A complete and thorough bridging of the rotor and stator collectors therefore occurs and permits transferring current across the chamber for delivery to the machine terminals. As the load current increases and establishes the larger magnetic pumping forces, the liquid metal will move inwardly a greater distance so that for the most extreme condition of operation, i.e., maximum current and minimum rotor speed, the pumping land surface 194 would be covered to approximately one-half of its length. Even under this extreme condition, the forces on the liquid in the current transfer chamber are balanced and the desired amount of liquid metal is both introduced into and discharged from the chamber. The pumping lands provided by the coacting surfaces on the left side of the collectors are therefore self-balancing and fill with liquid metal only to that level which is required by the particular value of current being transferred across the chamber.

In one design of generator having a rotor collector diameter of 35″ and a 1/16″ radial depth of current transfer chamber, a total liquid metal discharge area of approximately seven square inches is available for discharging liquid to the drain. With dimensions of these values, when current in the neighborhood of 600,000 amperes is transferred across the chamber, a pumping force of 4 p.s.i. is generated to maintain the required balance in the chamber.

Figure 12:
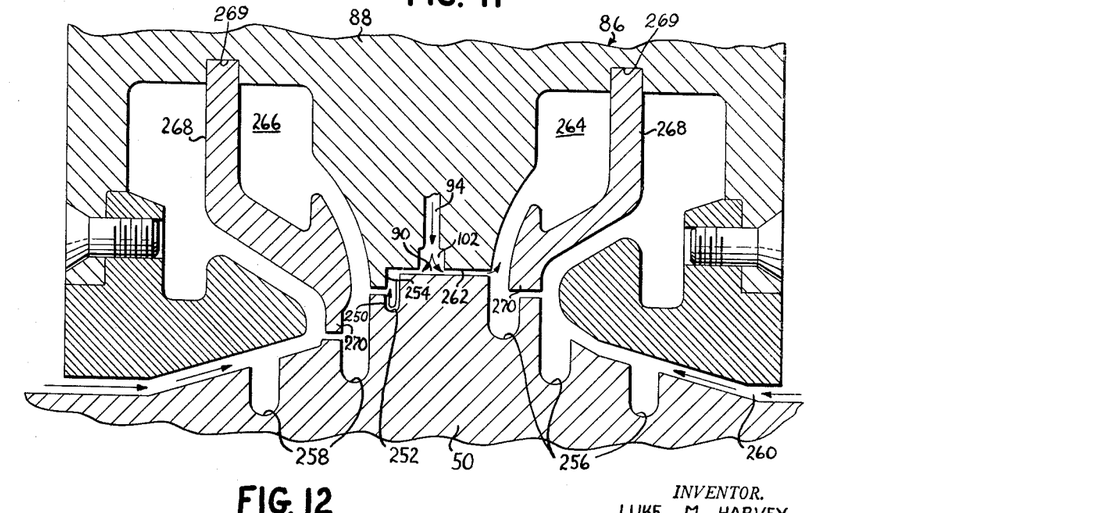
FIGURE 12 is still another modification of the illustrating applications of the inventive teachings to smaller type generators.

It is obvious that a single rather than a plurality of pumping lands may be used on one side of the rotor collector when the machine is of relatively small size. A single pumping land arrangement would be employed where it can effectively resist the magnetic pumping forces existent in the chamber 90 by returning all the liquid metal to the chamber. Such an arrangement is shown in the modification of FIGURE 12 wherein the rotor collector 50 does not rise as abruptly or sharply from the shaft as in the previously described designs. It will be noted that the design also is not as complicated and consists of the collector 50 having a single pumping land 250 and annular channel 252 arranged for coaction with wall 254 of the stator collector 86. Additional grooves 256 and 258 are provided on the opposite sides of the collector for preventing liquid metal from entering the air gap 260 of the machine.

The stator current collector includes an internal wall 262 which coacts with the rotor collector 50 to form the current transfer chamber 90. Liquid metal is pumped into chamber 90 from inlets 102 and recesses 264 and 266 on opposite sides of the collector serve to return heated liquid metal to the drain for cooling. In order to control the flow pattern of liquid metal after it leaves the transfer chamber 90, deformed rings 268 fitted in channels 269 of inset 86 have their inner ends 270 positioned between the rotor collector 50 and a protruding side of member 86.

The forces acting on the liquid metal in the chamber 90 of this modification is the same as that for the other species, and a self-balancing action is achieved in the same manner. With the machine in operation, the magnetic pumping forces which are proportional to the useful current generated by the machine, tend to move the liquid to the right as viewed in FIGURE 12. Although the centrifugal forces of the liquid is very high, particles thereof nevertheless impinge against the flat surfaces 254 and are deflected into contact with sides 250 of the rotor collector. As previously described, the surfaces 250 pressurize the liquid in the chamber in accordance with the value of current being transferred between the rotor and stator collectors. Large quantities of liquid metal are moved through the chamber at this time however, while maintaining pressure therein, and when the liquid moves off the surface 262 of the stator collector, its centrifugal force causes it to move at a high velocity into the drain 264. Any partciles that move inwardly toward the shaft are caught in the grooves 256 and 258 and sent hurtling outwardly toward the drains once again.

In some instances it may be desirable to make the inner surface 270 of rings 268 of narrower construction to insure movement of liquid metal to the drains. With the ends narrowed, less surface area is exposed to the liquid particles as they are accelerated outwardly by the wall surfaces in the grooves 256 of the rotating shaft. Although the drains shown are not the same as those of the previous modifications, it will be apparent that these merely are annular passages which lead to the main drain at the bottom of the machine.

In both of these modifications, nitrogen gas is used for cooling the operating parts and preventing seepage of liquid metal through the labyrinths, in the same manner as that described for the generator shown in FIGURE 1.

A further modification to assist in preventing liquid metal leakage into the air gap may be obtained by extending the shoulder 130 in a direction outwardly from the air gap to being its outermost tip in line with the deflecting shoulder 62 on the rotor collector.

Operation

The generator is started from rest with the liquid metal pumps turned off. After the rotor has been accelerated to rated speed, the pumps 98 are started, and the current transfer chamber 90 completely filled with liquid metal. When the field coils 44 are excited to produce flux, a voltage is induced in the solid rotor core thereby causing current to flow along the cyindrical copper conductor 51 to the rotor current collectors. Considering one collector only, the centrifugal forces resulting from liquid rotation, supplemented by magnetic forces, causes the liquid to be displaced outwardly along the sides of the rotor collector, but the curved pumping lands 92 divert the liquid into contact with the rotating collector side surfaces thus causing the liquid to be circulated within the current transfer chamber. This action effectively establishes and maintains a pressure in the chamber to provide a liquid metal bridge between the exposed rotor and stator current collector surfaces. Pressure is maintained in this area by the pumping action and current delivered to the rotor collector is transferred across the chamber or air gap to the stator current collector with its coated copper surface 93 prior to delivery through plates 82 and 78 and cylindrical member 74 to the rings 76 and terminals 140. Since the connectors 144 interconnecting the rings 76 with terminals 140 are made at spaced points around the rings, a proper balance of current flow in the machine is obtained thus providing a minimum of heating with optimum compensation and regulation characteristics. The copper cylindrical member 51 on the rotor surface carries current to the rotor collector while the cylindrical conductor 74 transfers the current in an opposite direction to the terminals after it has crossed the current transfer chamber. These copper conductors serve to prevent flux saturation of the iron and thereby permit constant voltage and good regulation of the machine. The stator conductor 74 is the equivalent of a compensating winding. Positioning of the conductor in this manner minimizes the induced voltage which occurs with changes in the connected load.

The shoulders 62 on the rotor collector direct any particles of liquid metal leaking from the current transfer chamber into the annular channels 109 which carry the liquid to drain outlet 116. Since gas flows through the labyrinth toward channels 109, it prevents seepage of liquid particles into the gap. This portion of the cooling fluid is also delivered through channels 109 and outlet 116

The liquid metal absorbs considerable heat during circulation in the chamber, but the spaced ports 105 permit adequate recirculation to and through coolers located outside the generator housing.

It will be evident that many different designs and configurations of parts may be restored to for obtaining the desired pumping action with consequent establishment of pressure in the current transfer chamber and circulation through the coolers. The general inventive concept is that of providing a structure for pressurizing the liquid in the current transfer chamber in order to effectively transfer current across the gap. Accordingly, annular rings of varying design or other structures can be provided for carrying out the above described pumping function. Further, it is not necessary that the exposed surface of the rotor collector lie in a plane concentric with the shaft since it may conveniently assume other configurations. Such a deviation from the construction shown would call for a change in position and configuration of the pump lands and/or in the size, number and location of the liquid exhaust ports in order to establish and maintain a pressure in the current transfer chamber. Likewise, the position and configuration of the shoulders 62 on the rotor collector may be modified or even eliminated according to the degree of leakage found in any particular machine. The gas which is supplied to the cavity is under sufficient pressure to prevent flow of liquid metal into the air gap. As previously described, this gas is delivered to a tank and separated from the liquid prior to redelivery to the machine. The other portions of the gas not circulated through the labyrinth seal are circulated in the air gap on that side of the stator having the terminals thus also effecting cooling of the cylindrical conductors employed to deliver current to and from the rotor and stator current collectors. When it is desired to stop the machine, the current is brought to zero and the liquid metal pumps turned off. The pressure developed by the rotating collector forces the liquid metal out of the current transfer chamber, and it drains back into the storage tank.

It will be evident that many modifications and variations are possible in light of the above teachings. It therefore is to be understood, that within the scope of the appended claims, the invention may be practiced otherwise than as specifically described.

What I claim as new and desired to secure by Letters Patent of the United States is:

1. An acyclic generator comprising a stator and an armature supported for rotation therein, said stator comprising a magnetic core having a field member capable of producing sufficient flux for completely saturating the magnetic core of the armature, aligned cooperating members on the stator and armature spaced from each other to form a current transfer chamber, liquid metal supply and discharge means connected with said chamber for permitting circulation of a quantity of liquid metal through the chamber and thereby providing for transfer of current thereacross during generator operation, and a layer of non-magnetic conductive material bonded to the surfaces of the stator and the armature cores thereby permitting current flow in opposite directions in the stator and armature surfaces for minimizing the effects of induction when the load current changes in value.

2. An acyclic generator comprising a pair of stators and an armature, each stator comprising a magnetic core having a field member capable of providing sufficient flux to generate a voltage in the armature during rotation, cooperating current collecting members on the stators and armature spaced from each other a distance to provide a pair of axially spaced current transfer chambers, spaced liquid metal supply inlets and spaced discharge means connected with the chambers for circulating a liquid metal therethrough used in effecting transfer of current from the armature to the stators current conductive shells having a conductivity greater than the magnetic cores and bonded to the air gap surfaces of the armature and stator for respectively conducting current of substantially the same magnitude in opposite directions with respect to said chambers, said shells being positioned to prevent flux saturation of the magnetic cores by said current during load current changes and thereby permitting constant voltage and optimum regulation of the generator.

3. An acyclic generator comprising a pair of stators, an armature supported for rotation therein, said armature comprising a solid magnetic core having a member of different conductivity than said core disposed concentrically on its peripheral surface, each stator including a field member and a magnetic core likewise equipped with a member of different conductivity than said stator core, each stator core being further provided with a groove designed to the same general configuration as spaced cooperating flanges disposed on the armature peripheral surface respectively to form chambers therebetween, liquid metal supply and discharge means separately connected with the chambers, means on each stator and positioned within its chamber so that upon rotation of the armature, the liquid metal in the chambers is moved into contact with said means which pressurizes the liquid metal and provides full surface contact between the liquid and the current collecting members in the generator thereby permitting unimpeded transfer of current from the armature to the stators.

4. An acyclic generator comprising a pair of stators each including a field member, an armature supported for rotation therein, said armature comprising a solid magnetic body having a pair of spaced outwardly protruding current collecting portion thereon for receiving current generated in the armature during generator operation, each stator including a channel designed to receive its respective current collector portion of the armature to form a chamber therebetween, liquid metal supply and discharge openings in the channel walls of each stator for circulating liquid metal through the chamber, and inwardly directed members on the channel walls protruding into each chamber so that upon rotation of the armature, movement is imparted to the liquid and the inwardly directed members are made effective in diverting the liquid back into contact with the armature, thereby creating a liquid pressure in each chamber and providing full surface contact between the liquid and the armature and stator collecting portions for effecting transfer of current across the chamber prior to delivery to the generator terminals.

5. The combination according to claim 4 wherein the inwardly directed members comprise at least one annular ring shaped to recirculate liquid within the chamber and thereby establish a pressure therein.

6. The combination according to claim 4 wherein the inwardly directed members comprise annular rings of curved configuration shaped to receive liquid displaced axially and to reverse the direction of liquid flow to obtain recirculation thereof and establishment of pressure in the chamber.

7. An acyclic generator comprising a pair of stators each having a field member, an armature supported for rotation therein, said armature comprising a magnetic core having conducting means on its peripheral surface for conveying current to a pair of spaced current collectors on the armature when the latter rotates in a field established by each field member, each current collector comprising an outwardly protruding member having a flat peripheral surface axially aligned with the armature, a cooperating current collector on each stator connected with the generator terminals and radially spaced from the armature current collectors, a pair of spaced chambers respectively formed by the coacting armature and stator collectors, liquid metal supply and discharge means connected with each chamber for circulating liquid metal therethrough during generator operation, and an annular member on each stator directed toward its chamber and constituting the stationary member of a pump which coacts with the armature and stator current collectors such that upon rotation of the armature, its current collector imparts a velocity to the liquid metal in each chamber and when the liquid is displaced axially by magnetic forces, the inwardly directed member on each stator receives the displaced liquid and diverts it back into contact with its respective rotating current collector thereby establishing a pressure head in each chamber for assisting in maintenance of full surface contact between the liquid and the armature and stator current collectors.

8. The combination according to claim 7 wherein the liquid supply means comprises separate openings spaced around and formed in the walls of the stator current collectors and which communicate directly with the chambers, said discharge means comprising a plurality of spaced openings on opposite sides of each chamber for receiving the liquid metal displaced axially by the magnetic forces acting on the liquid when carrying current.

9. An acyclic generator comprising a pair of stators, an armature supported for rotation therein, said stators comprising magnetic cores having field members capable of producing sufficient flux for completely saturating the magnetic core of the armature, aligned cooperating members on the stators, and armatures spaced from each other by the generator air gap to form a pair of current transfer chambers, liquid metal supply and discharge means connected with each chamber for permitting circulation of a quantity of liquid metal through each chamber and thereby providing for transfer of current thereacross during generator operation, and a layer of non-magnetic conductive material bonded to the surfaces of the stator and the armature cores thereby permitting current flow in opposite directions on the stator and armature surfaces for minimizing the effects of induction when the load current changes in value, and means connecting said layer of conductive material on each stator surface to a terminal arrangement for transferring current generated in the machine to bus bars for thereby achieving balanced flow of current in the generator.

10. The combination according to claim 9 wherein said means comprises a plurality of connectors attached at one end to said layer of conductive material on each stator surface and terminating at their other ends in terminals extending to bus bars.

11. An acyclic generator comprising a pair of stators, an armature core arranged for rotation therein, a pair of spaced field coils respectively mounted in said stators, a pair of current collectors of rectangular cross-section mounted on the armature and positioned in alignment with the field coils, and recessed current collectors in the stators having a design complementary to the armature current collectors, current transfer chambers between the adjacent collector surfaces, a liquid metal maintained under pressure in said chambers when the coils are energized and current is transferred from the armature across the chamber to the stator collectors, a pair of spaced rings respectively to said stator current collectors, means interconnecting said rings with risers connected with a network of bus bars for delivering current to a point remote from the generator, said means comprising conductive plates connected at four equidistantly spaced points to each of said rings for providing equal distribution of current to the bus bars connected with the generator.

12. The combination according to claim 11 wherein the plates connected to equidistant points on each side of the generator are divided so that the upper plates deliver current from the upper half of the generator while the lower plates deliver current from the lower half of the generator.

13. An acyclic machine comprising a pair of spaced annular stators each having a field coil and an armature positioned for rotation therein, said armature comprising a magnetic core having a pair of spaced annular current collectors protruding from its peripheral surface, each of said stators comprising a magnetic core having an annular cavity defining a current collector and of a configuration suitable for respectively accepting the current collectors on the armature surface, said cavity being formed by wall surfaces generally complementary to the armature current collector surfaces and thereby forming a current transfer chamber therebetween, spaced liquid metal supply and discharge openings in the stator cavity walls for delivering liquid metal into the chamber and discharging it to a drain for subsequent recirculation through the chamber, at least one pumping device formed on each armature current collector and coacting with the wall surfaces of the stator current collectors for imparting a pressure to the liquid circulating in the chambers during the time the armature is rotating, said pressure being of magnitude sufficient to balance the magnetic and centrifugal forces which tend to move the liquid axially out of the chambers in addition to the pressure supplied by a pump remote from the generator, and a labyrinth comprising a multitude of annular grooves formed on opposite sides of the armature current collectors and arranged to receive any leakage of liquid metal from the chambers, annular openings formed in the stator cavity walls and in a position to receive such liquid metal as may be thrown outwardly by centrifugal force from the armature annular grooves prior to delivery to a drain, and terminals respectively connected to each of said stators, the arrangement being such that when the field coils are energized and a voltage is induced in the armature, currents of high magnitude flow from the armture current collectors across the chambers containing the pressurized liquid metal to the stator current collectors which then deliver the current to said terminals.

14. An acyclic machine comprising a pair of spaced annular stators each having a field coil therein and an armature positioned for rotation in said stators, said armature comprising a magnetic core having a pair of spaced current collectors protruding outward from its peripheral surface, each of said current collectors projecting into an annular cavity in each of the stators and respectively forming separate chambers therebetween, liquid metal supply and discharge passages in the walls of each of the stator cavities for circulating liquid metal through the chambers to facilitate the transfer of current from the armature current collectors to current collectors defined by the cavity walls on the stators, at least one pumping land formed on a side of the armature current collectors designed to cooperate with the walls of the stator current collectors for diverting the liquid metal back into said chambers and maintaining a pressure therein of sufficient value to cause the liquid metal to form an uninterrupted bridge between the armature and stator current collectors, said discharge passages being formed in a wall of each stator cavity and on the side opposite from the pumping land thereby requiring the liquid metal to flow across the surface of the armature current collector prior to being discharged into said passages for delivery to a drain, a labyrinth seal comprising grooves formed on opposite sides of the armature current collectors designed to cooperate with annular outlets formed in the walls of the stator cavities for discharging thereinto any liquid metal which may escape from the chambers during operation, at least one of said grooves being positioned along the side of each current collector for discharging liquid metal from the chamber directly into the discharge passages connected with the drain, and terminals connected to said stators for supplying generated power to an external source.

15. The combination according to claim 14 wherein the liquid metal is supplied from an outlet directly into the chamber while the discharge passages are disposed in each stator and on opposite sides of the stator current collector.

16. The combination according to claim 14 wherein the pumping land comprises a flange formed on a side of each armature curent collector and including a recess between the flange and the side walls of the collector for causing the liquid metal flowing thereinto from the chamber to be thrown radially outward by centrifugal force to establish a pressure in the chamber and thereby maintain an uninterrupted liquid metal bridge between the rotating armature current collectors and the stator current collectors.

17. An acyclic machine comprising a pair of spaced annular stators each having a field coil therein and an armature positioned for rotation in said stators, said armature comprising a magnetic core having a pair of spaced current collectors protruding from its peripheral surface, each of said collectors having portions increasing gradually in diameter from the opposite sides of a central member, annular grooves formed on the gradually increasing portions for forming one part of a labyrinth seal, each of said stators including a magnetic core equipped with a cavity formed to the general configuration of the armature current collectors, the arrangement being such that the armature current collectors respectively project into said cavities which define the stator current collectors to form current transfer chambers therebetween, annular ducts communicating with a drain positioned on opposite sides of the stator current collector, said annular ducts being located in the stator cavity walls to coact with the armature annular grooves which propels any liquid metal leaking from the chambers outwardly into said annular ducts for delivery to the drain, a separate liquid supply inlet to each of said chambers and a discharge outlet therefor on one side of each stator collector, a pumping device located on a side wall of each armature central member arranged for coaction respectively with a cooperating part on each stator current collector for diverting the liquid metal back into the chambers when it is moved axially toward the pumping device by magnetic forces when the coil is energized, a second pump in communication with said chambers for circulating the liquid metal therethrough, a groove on one side of each armature current collector and oppositely disposed from the stator discharge outlets for projecting by centrifugal force the liquid metal discharged from the chambers directly into the discharge outlets for delivery to the drain, and means circulating an inert gas through the air gap formed by the armature and stators for carrying entrained particles into the drain.

18. An acyclic generator comprising a pair of stators, an armature arranged for rotation therein, a flux producing device in each stator jointly capable of completely saturating the generator when energized, aligned current collectors respectively formed on said armature and stators, a pair of spaced current transfer chambers formed by the collectors, liquid metal supply and discharge means connected with each chamber and means continuously circulating liquid metal through each chamber so that when said devices are energized and the armature generates current, liquid metal in each chamber bridges the collectors and facilitates transfer of said current thereacross prior to delivery to the generator terminals, means formed by coacting stator and armature parts for establishing and maintaining a balancing pressure in each chamber equal to the pressure of liquid metal supplied to each chamber and the magnetic pumping forces tending to displace said liquid axially of each chamber during generator operation, a current distribution ring affixed to each stator current collector, and a cylindrical conductor interconnecting each ring with terminals on said generator for supplying power to a remote source, each conductor being attached to each ring in a manner to permit uniform distribution of current flow axially from the current collector and ring through said conductor to the terminals.

19. The combination according to claim 18 wherein each conductor is hollow and interconnects the terminals with each ring, each ring being hollow throughout its length, and a coolant circulated through said conductors and said ring for carrying away heat therefrom during generator operation.

20. An acyclic generator comprising a pair of stators, an armature arranged for rotation therein, a flux producing device in each stator jointly capable of completely saturating the generator when energized, aligned current collectors respectively formed on said armature and stators, a pair of spaced current transfer chambers formed by the collectors, liquid metal supply and discharge means connected with each chamber and means continuously circulating liquid metal through each chamber so that when said devices are energized and the armature generates current, liquid metal in each chamber bridges the collectors and facilitates transfer of said current thereacross prior to delivery to the generator terminals, and means formed by coacting stator and armature parts for establishing and maintaining a balancing pressure in each chamber equal to the pressure of liquid metal supplied to each chamber and the magnetic pumping forces tending to displace said liquid axially of each chamber during generator operation, said means comprising axially and radially disposed flat surfaces respectively formed on the stationary stators and the rotatable armature, said surfaces being effective in returning liquid metal to each chamber which previously was displaced axially by magnetic pumping forces in each chamber.

21. An acyclic generator comprising a pair of stators, an armature arranged for rotation therein, a flux producing device in each stator jointly capable of completely saturating the generator when energized, aligned current collectors respectively formed on said armature and stators, a pair of spaced current transfer chambers formed by the collectors, liquid metal supply and discharge means connected with each chamber and means continuously circulating liquid metal through each chamber so that when said devices are energized and the armature generates current, liquid metal in each chamber bridges the collectors and facilitates transfer of said current thereacross prior to delivery to the generator terminals, means formed by coacting stator and armature parts for establishing and maintaining a balancing pressure in each chamber equal to the pressure of liquid metal supplied to each chamber and the magnetic pumping forces tending to displace said liquid axially of each chamber during generator operation, and labyrinth seals comprising coacting stator and armature surfaces on opposite sides of said collectors.

References Cited by the Examiner
UNITED STATES PATENTS

| | | | |
|---|---|---|---|
| 2,588,466 | 3/52 | Barnes | 310—178 |
| 2,706,155 | 3/57 | Sellers | 310—178 |
| 2,845,554 | 7/58 | Schwab et al. | 310—178 |
| 2,869,007 | 1/59 | Ringland | 310—178 |

MILTON O. HIRSHFIELD, *Primary Examiner.*